United States Patent [19]

Morrill

[11] 4,264,054

[45] Apr. 28, 1981

[54] METAL-TO-METAL SEAT HUB SEALS

[75] Inventor: Charles D. Morrill, Bellaire, Tex.

[73] Assignee: McEvoy Oilfield Equipment Company, Houston, Tex.

[21] Appl. No.: 955,612

[22] Filed: Oct. 30, 1978

[51] Int. Cl.$^3$ .............................................. F16K 3/02
[52] U.S. Cl. ............................. 251/328; 277/116.8; 277/190; 285/340; 285/DIG. 18
[58] Field of Search ............... 251/328; 285/DIG. 18, 285/340, 348; 277/190, 236, 116.8

[56] References Cited

U.S. PATENT DOCUMENTS

| | | | |
|---|---|---|---|
| 1,825,962 | 10/1931 | Laird | 285/340 X |
| 2,417,181 | 3/1947 | Sandilands | 285/148 |
| 2,433,638 | 12/1947 | Volpin | 137/246.12 |
| 2,796,230 | 6/1957 | Grove et al. | 251/172 |
| 2,992,840 | 7/1961 | Reynolds et al. | 285/340 |
| 2,995,388 | 8/1961 | Morello, Jr. et al. | 285/340 |
| 3,006,599 | 10/1961 | Eckert, Jr. | 251/328 X |
| 3,026,084 | 3/1962 | Bryant | 251/327 X |
| 3,135,285 | 6/1964 | Volpin | 251/328 X |
| 3,365,219 | 1/1968 | Nicolaus | 285/340 |
| 3,463,518 | 8/1969 | Broussard et al. | 285/340 |
| 3,538,938 | 11/1970 | Volpin | 137/246.12 |
| 3,690,682 | 9/1972 | Ferrill | 277/102 |
| 3,696,831 | 10/1972 | Fowler | 137/246.12 |
| 4,029,294 | 6/1977 | McCaskill et al. | 251/282 |

FOREIGN PATENT DOCUMENTS

| | | | |
|---|---|---|---|
| 582186 | 8/1925 | Canada. | |
| 1122766 | 1/1962 | Fed. Rep. of Germany. | |
| 1556413 | 12/1968 | France | 285/340 |
| 323305 | 12/1934 | Italy. | |
| 1018227 | 11/1966 | United Kingdom | 285/340 |

OTHER PUBLICATIONS

Hamby, T. W. and Tuttle, R. N., "Deep, High Pressure Sour Gas Wells–An Industry Challenge," 1975 Annual Meeting, Div. of Production, American Petroleum Institute, Dallas, Texas, Apr. 1975.
Hamby, T. W., Broussard, L. P., and Taylor, D. B., "Producing Mississippi's Deep High Pressure Sour Gas," Paper No. SPE5604, Soc. of Petroleum Engineers of American Institute of Mining, Metallurgical, and Petroleum Engineers, Inc., 1975.

*Primary Examiner*—Arnold Rosenthal
*Attorney, Agent, or Firm*—Ned. L Conley; David Alan Rose; David M. Ostfeld

[57] ABSTRACT

A valve has a metal-to-metal seal system between the flow bores of the valve body housing and each of the valve seat hubs. Each seal system includes an elastic dished metal ring gasket and a retainer ring. Each metal gasket is softer than each of the seat hub and the valve housing, is of rectangular cross-section, and the edge at the inner periphery on the convex side is flattened. Each seal system is disposed on an annular groove cut in the outer periphery surface of the end of the seat hub. One side of the metal ring gasket is located adjacent to the shoulder of the seat hub formed by the groove cut into the outer periphery end of the seat hub. The retainer ring is reciprocably mounted on the seat hub groove adjacent to the other side of the metal ring gasket and extends beyond the end of the seat hub prior to activation of the seal system. Each seal system is activated by insertion of the seat hub on which it is mounted into the corresponding bore of the valve housing until the end of the seat hub contacts a stop shoulder in the bore. The stop shoulder of the valve bore causes the retainer ring to advance towards the seat hub shoulder far enough to flatten out the dished metal ring gasket sufficiently for the inner and outer peripheries of the ring gasket to engage the wall of the groove of the seat hub and the wall of the bore respectively with enough pressure to cause plastic deformation of the inner peripheral edge on the concave side and the outer peripheral edge on the convex side of the gasket. The retainer ring also prevents substantial movement of the seal relative to the seat hub and housing when the valve is in use despite variations in the temperature of the valve and the pressure of the fluid therein and thereabout.

5 Claims, 6 Drawing Figures

Fig. 1

METAL-TO-METAL SEAT HUB SEALS

CROSS REFERENCES TO RELATED APPLICATIONS

The valve of this invention may be of the high pressure gate valve type as disclosed in U.S. Pat. No. 4,029,294, issued June 14, 1977 to McCaskill et al entitled "High Pressure Valve".

The sealing means of the present invention is related to the seals for tubing hangers disclosed in my U.S. Pat. Nos. 4,056,272 and 4,109,942 issued Nov. 1, 1977 and Aug. 29, 1978 respectively, entitled "Seal" and in my pending U.S. patent application Ser. No. 833,553, filed Sept. 15, 1977, entitled "Remote Automation Make-up Stab In Sealing System", and the stem sealing means disclosed in my pending U.S. patent application Ser. No. 697,084, filed June 16, 1976, entitled "Extreme Temperature, High Pressure, Balanced Rising Stem Gate Valve With Super Preloaded, Lubricated, Metal-to-Metal Stem Seals".

The foregoing patents and applications are assigned to the owner of the present application, and their disclosures are incorporated herein by reference, including the references to the state of the art.

BACKGROUND OF THE INVENTION

1. Field of the Invention

This invention relates to valves and more particularly to gate valves.

2. Description Of The Prior Art

A non-rising stem gate valve with separable seats and automatic plastic sealed gate-seat and seat body interfaces is disclosed in U.S. Pat. No. 2,433,638—Volpin. A similarly sealed valve of the rising stem, balance type intended for high pressure use is disclosed in U.S. Pat. Nos. 3,538,938—Volpin, and 3,696,831—Fowler et al. In the latter two patents chevron stem packing compressed by annular screw plugs is employed for the stem seals.

A valve known as a "Graygate" appears to employ plural but separated metal-plastic-metal sandwich seals around the valve stem and in a bonnet pocket but the metal rings are not of the dished type and are not coined at their peripheries when in use. The seat hub seals are combinations of plastic and metal pieces but also do not show dished type metal rings and are not raised at their peripheries when in use.

It is believed that the valve of the present invention can be used without leakage in environment of higher pressure and over a wider temperature range than the valves discussed above.

Stacked dished packing rings for a pipe hanger are disclosed in U.S. Pat. No. 2,417,181—Sandilands, but Sandilands does not disclose metal rings that are flattened by a compression means, in a seat hub.

Difficulties experienced with dished metal-to-metal seal rings of the type disclosed in U.S. Pat. No. 2,922,840 to Reynolds et al are discussed in my aforementioned U.S. Pat. No. 4,056,272.

BRIEF DESCRIPTION OF THE INVENTION

According to the invention, a valve has a metal-to-metal seal system between the valve body and each of the valve seat hubs. Each seal system includes a dished metal ring gasket and a retainer ring. Each metal ring gasket is softer than each of the valve housing and the seat hub, is of rectangular cross-section, and the edge at the inner periphery on the convex side is flattened. Each seal system is disposed on an annular groove cut in the outer peripheral surface of the end of the seat hub with the retainer ring being able to reciprocate on the seat hub. The groove includes a shoulder at its inner end and is open at its outer end. One side of the metal ring gasket is located adjacent to the shoulder and the other side of the metal ring gasket is adjacent to the retainer ring. Prior to insertion of the seat hub into the valve body, the retainer ring extends longitudinally beyond the outer end of the annular groove. Upon insertion of the seat hub into the valve body, the valve body forces the retainer ring toward the shoulder a sufficient distance to cause the adjacent metal ring gasket to flatten out sufficiently for the inner and outer peripheries of each ring to engage the surfaces of the seat hub and valve body respectively with enough pressure to cause plastic deformation of the inner peripheral edge on the concave side and the inner peripheral edge on the convex side and the outer peripheral edge on the convex side. The retainer ring also prevents movement of the seal relative to the body when the valve is in use despite variations in the temperature of the valve and the pressure of the fluid therein and thereabout.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

The metal-to-metal seat hub seal in accordance with the preferred embodiment of the present invention is illustrated in FIGS. 2-5, inclusive. The metal-to-metal seat hub seal of the present invention may be used with any valve including, for example, a high temperature/low pressure valve or a high pressure/low temperature valve or a high pressure/high temperature valve or an ordinary water faucet valve which may require seat hub seals. For convenience only and not as a limitation, the preferred embodiment of the present invention is described in relation to a high pressure, through-conduit, rising stem, gate type valve such as that illustrated in the above mentioned U.S. Pat. No. 4,029,294. As set out infra, the metal-to-metal seat hub seal system of the preferred embodiment of the present invention is substituted for the seat hub seal 240 of the valve illustrated in the above mentioned U.S. Pat. No. 4,029,294 to show the relationship of the preferred embodiment of the present invention to the rest of a valve.

Figure 1:
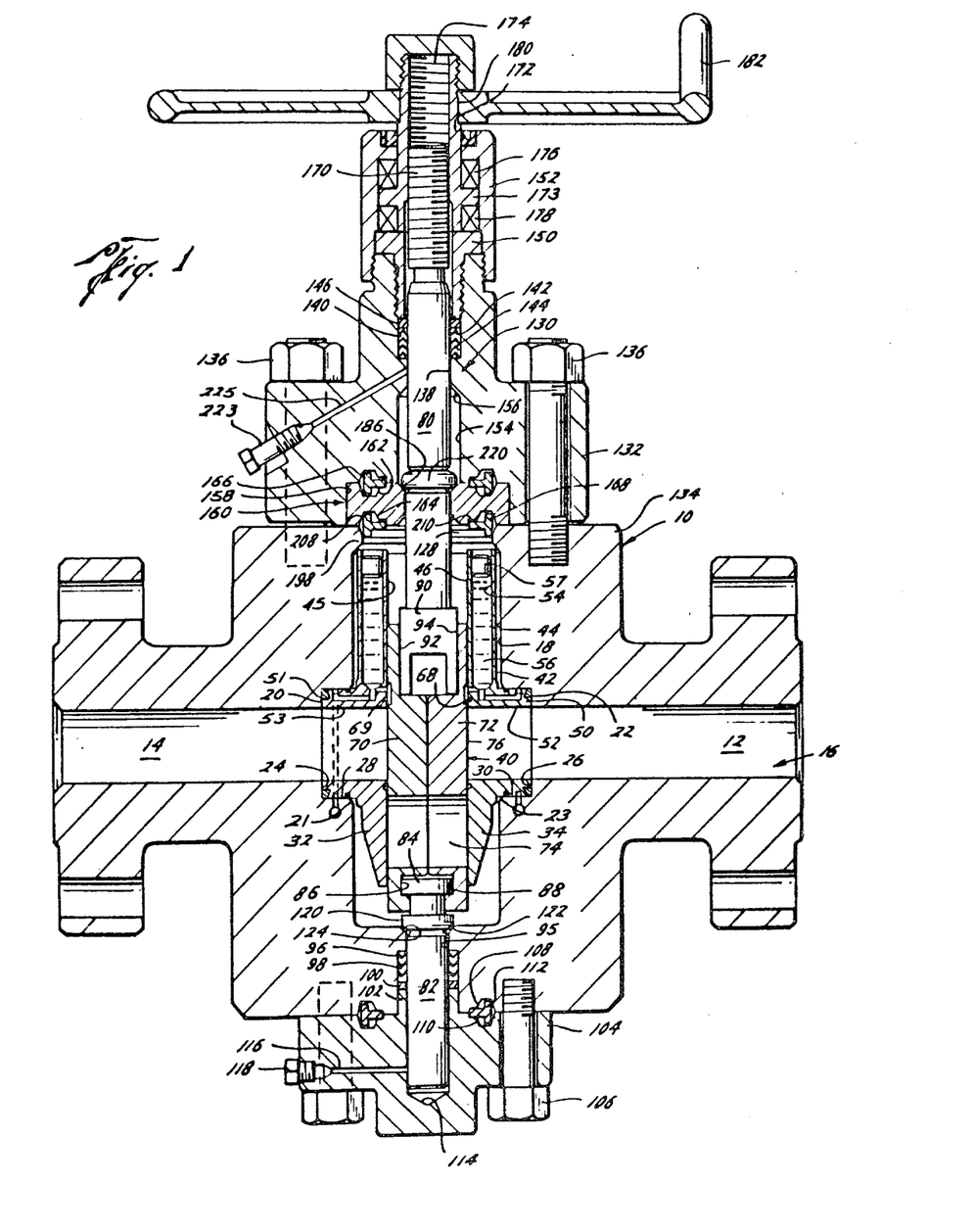
FIG. 1 is a vertical section through a valve embodying the invention.

Referring to FIG. 1, there is shown a valve comprising a valve housing or body 10 having opposed flow ports 12, 14 either of which may be the inlet or outlet depending upon the orientation of the valve in the line in which the valve is mounted, forming the flow way 16 which is intersected interiorly of the housing 10 by a cylindrical closure or gate chamber 18 whose axis is generally at right angles to the flow way. As illustrated, flow port 14 is the upstream portion or inlet of the valve and flow port 12 is the downstream or outlet of the valve. The fluent material flowing through the line and valve shall be termed line fluids. The inner ends of flow ports 14, 12 are provided with coaxial counterbores 20, 22 respectively, circumscribing flow ports 12, 14 and forming inwardly facing annular shoulder 24, 26 and inwardly facing cylindrical walls 28, 30 respectively, the counterbore walls 28, 30 having a larger diameter than the diameter of flow ports 12, 14.

Closure chamber 18 and counterbores 20, 22 are adapted to receive a pair of gate seat members 32, 34 respectively. As gate seat members 32, 34 and their appurtenances are identical in construction and are arranged symmetrically on opposite sides of closure chamber 18, the description of one will, it will be understood, be applicable to both.

The gate seat member 34 is elongate in form, having an inwardly facing surface shaped to cooperate in sliding engagement with the abutting face of gate 40, as will be described hereinafter, and an outwardly facing surface 42 shaped to be substantially complimentary to the shape of the portion of the wall 44 forming closure chamber 18 surrounding the flow ports 12, 14 and extending longitudinally along chamber 18. In the illustrated embodiment, gate 40 is of the flat-sided form, and inner surface 46 is also flat. Further, gate seat member 34 includes a seat neck or hub 50 to be received by counterbore 22. Sealing system 240 provides sealing between hub 50 and valve body 10.

Gate seat member 34 is provided with a transverse opening 52 coaxial and registering with flow port 12 and flow way 16 and generally of the same diameter to provide full open flow therethrough.

Figure 2:
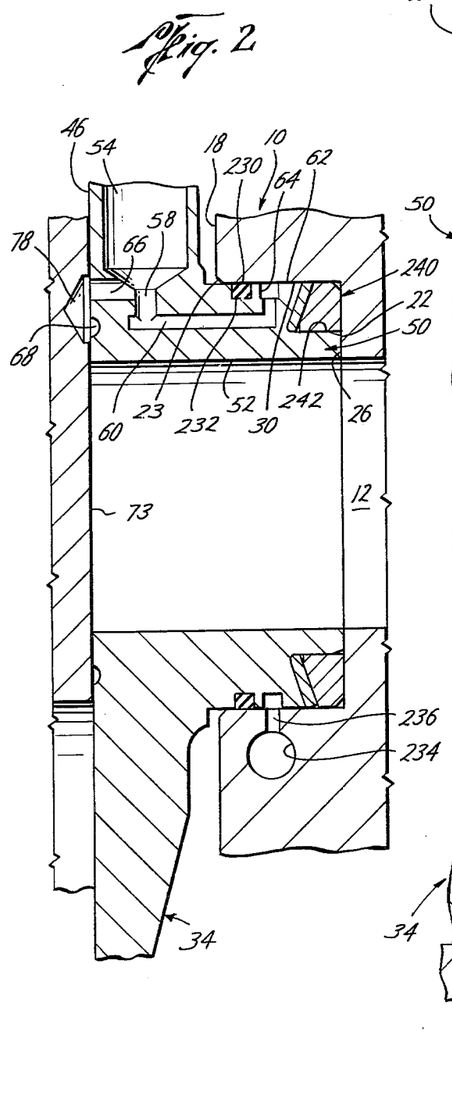
FIG. 2 is a fragmentary sectional view taken in the same plane as FIG. 1 but to a larger scale showing the sealant system.

The upper end portion of gate seat member 34 is bored from its outer end to provide a reservoir 54, adapted for receiving a flowable or fluent sealant 56, such as is conventionally used in automatically sealing valves. A cylindrical piston or barrier 57 is slidably mounted in reservoir 54 for pressurizing the sealant as will be subsequently described. Referring now to FIG. 2, the lower end of reservoir 54 communicates through a longitudinal passage 58 with a passage 60 which extends transversely through the body of the gate seat member 34 to the outer peripheral surface 62 of seat hub 50. The outer end of transverse passage 60 communicates with an annular sealant groove 64 formed in outer surface 62 of gate seat member 34 encircling opening 52. The lower end of reservoir 54 also commnicates through a transverse passage 66 which communicates with the exterior of inner face 46 of gate seat member 34 and is spaced from an annular sealing groove 68 formed in inner surface 46 encircling opening 52.

Referring to FIGS. 1 and 2, a threaded socket 234, shown generally, is formed in the side of body 10 and is adapted to receive a conventional pressure fitting for introducing sealant material 56 into socket 234. With this arrangement, it will be seen that sealant 56 introduced through the fitting will be forced via passage 236 through groove 64, thence via passage 60 and 58 into the interior of reservoir 54 below.

Referring again to FIG. 1, gate 40 is disposed in closure chamber 18 for vertical reciprocation across the flow way 16 between the gate seats 32, 34. The gate 40 is constructed of a pair of mating generally rectangular gate segments, 70, 72, having flat outer faces adapted for slidable engagement with the inner end faces 45, 46 of the seat members 32, 34. The gate 40 is provided near its lower end with a transverse flow port 74, defined by registered openings in gate segments 70, 72, and adapted to register with openings 52, 53 in seat members 32, 34 when the gate 40 is in the raised or flow way-opening position. The upper portions of the gate segments 70, 72 form the closure section 76 which is adapted to cut off flow through flow way 16 when the gate is in the lower or flow way-closing position as seen in FIG. 1. The upper portion of gate segment 72 is provided on its outer face with a jumper recess 78 shown in FIG. 2 adapted to provide communication between sealant groove 68 and the inner end of transverse passage 66 when gate 40 and gate segment 72 are in the flow way-closing position as shown in FIG. 2. It will be understood that when the gate 40 is moved upwardly to the flow way-opening position, the corresponding displacement of recess 78 will serve to disconnect groove 68 from passage 66.

It should be understood that the valve shown in the figures is normal acting if conventional remote actuation were used, in that during service of the valve, it is anticipated that the valve will generally be closed to fluid flow without remote actuation. However the valve could obviously be reversed acting whereby during service without remote actuation the valve would generally be in the open position. The normal acting valve shown can be made reverse acting by merely modifying gate segments 70, 72 whereby transverse flow port 74 will register with openings 52, 53 when the gate is in the lower position rather than in the upper position as previously described. Note that regardless of whether the valve is normal acting or reverse acting, the normal position (i.e. the general position of the valve during operation) will occur when the gate 40 is in the lower position.

The details of seal system 240 are shown in 2, 3A, 3B, 4 and 5. Seal 230 and seal system 240 are received in annular grooves 232, 242 which circumscribe seat hub 50. Seal 230 and seal system 240 form seals with surface 30 of housing 10 on opposite sides of the sealant groove 64 and with the surfaces of grooves 232, 242 respectively. Seal 230 is an elastomeric or plastic o-ring seal. Seal system 240 includes metal seal ring gasket 244 and a retainer ring 246.

Groove 242 is located at the outer peripheral corner of hub 50 whereby groove 242 is two-sided, having sides 243, 245, with the opposing surfaces of counterbore 22 providing the other two sides to enclose groove 242. Ideally the thickness of seal system 240, after the seal system is activated, will be equal to the length of the groove 242 with the tolerance being on the side of seal system 240 having a greater thickness. Preferably the volume of groove 242 will substantially equal the volume occupied by seal system 240 after the seal system is activated. The surface 243 of the groove 242 is frusto-conical in shape at an angle which may, for example, be about 15° to a plane perpendicular to the axis of hub 50, but which may also, in many installations, be substantially less or substantially more than this, i.e., from about 0° to about 45°. The outer leading edge 253 of surface 245 is beveled.

Metal ring gasket 244 surrounds a portion of the substantially smooth cylindrical surface 245 and is located adjacent to surface 243. The gasket 244 is frusto-conical in shape, having a width substantially greater than its thickness. The inner convex corner of the gasket 244 is flattened at 247. The other corners are preferably "broken". The cone of the metal gasket 244 is in the same direction as the cone of the surface 243 of the hub 50, but has a smaller included cone angle. The differences in the cone angles may be from 10° to 40° or more, depending upon the particular materials and proportions of the elements. In one design, which has been found to work satisfactorily, the gasket is about 0.06 inches thick, the frusto-conical surface 243 of the groove 242 is at approximately 15° to the plane perpendicular to the axis of hub 50 (cone angle 150°) and the surfaces of gasket 244 are at about 30° to the plane perpendicular to the axis of hub 50 (cone angle 120°). The upper edge of the inner periphery of the convex side of gasket 244 bears at 247 against the frusto-conical surface 243 of groove 242. The lower edge of the outer periphery of the concave side of gasket 244 bears against surface 249 of retainer ring 246 which has a close sliding fit around the cylindrical surface 245 of the groove 242.

Retainer ring 246 is a solid ring. The surface 249 of retainer ring 246 is frusto-conical in shape, except for flattened portion 257, and has the same characteristics as surface 243 of groove 242. The surface 249 of retainer ring 246 is beveled at an angle of, for example, slightly greater than 0° to 45°. The surface 251 opposite surface 249 of retainer ring 246 is flat, matching the surface of annular shoulder 26. Prior to activation of the seal system 240, the end of ring 246 having surface 251 extends beyond the outer edge of hub 50. (See FIG. 3B) The outer peripheral edge 255 of surface 251 is beveled.

Assembly of the sealing system 240 is accomplished by first sliding the metal ring gasket 244 past beveled leading edge 253 and onto surface 245 until it is located adjacent to surface 243. Retainer ring 246 is then slid past beveled leading edge 253 and onto surface 245.

The gasket 244 and ring 246 will be carried on the hub 50 without actuation of the sealing system 240 as the hub assembly is inserted into the counterbore 22. Beveled edge 255 aids in this insertion.

Seal system 240 is actuated as surface 251 of retainer ring 246 engages the annular shoulder 26 of housing 10. The force applied to seat 34 as it is inserted into counterbore 22 will cause retainer ring 246 to reciprocate on surface 245 of groove 242 in a direction toward surface 243 thereby forcing surface 249 to bear on metal ring gasket 244. As the retainer ring 246 moves along surface 245, the force exerted by surface 249 of retainer ring 246 on metal gasket 244 will begin to deform the gasket 244 causing it to assume the position shown in FIG. 3A. As in the gasket design disclosed in the Reynolds et al patent, surface 243 and surface 249 engage opposed faces of the gasket 244 to prevent it from buckling during deformation. The change in shape of the gasket 244 to conform to the shapes of surfaces 243, 249 is illustrated by comparing Figure 3A, the activated seal system, with FIG. 3B, the seal system prior to activation.

Figure 3A:
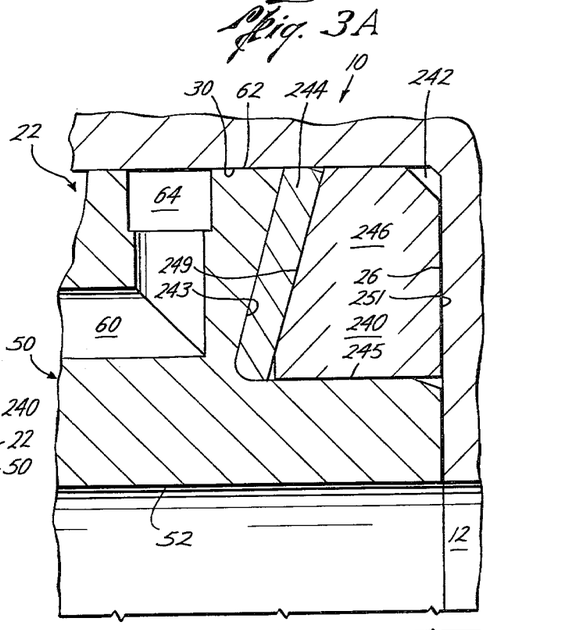
FIGS. 3A and 3B are a fragmentary sectional view taken in the same plane as FIG. 1 but to a larger scale showing the seat hub and mode of operation of the invention.
Figure 3B:
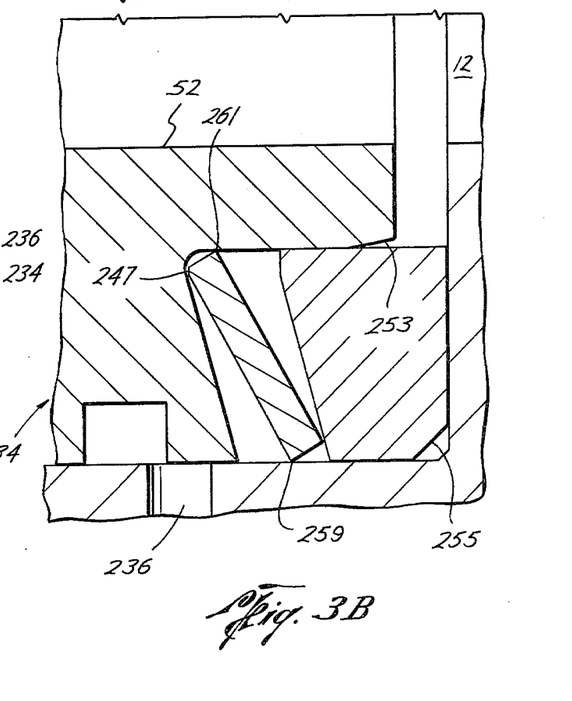

The deformation of gasket 244 causes a decrease in the inside diameter of the gasket 244 and an increase in the outside diameter of the gasket 244. The annular width of the gasket 244 is such that when it is compressed between the surfaces 243 and 249, as shown in FIG. 3A, the outer circumference moves radially outwardly and the inner circumference moves radially inwardly and pivots on the surface 245 of hub 50 until the corners 259, 261 of gasket 244 are deformed or "coined" to form a metal-to-metal seal with both the counterbore surface 30 of the housing 10 and the cylindrical smooth surface 245 of groove 242 so that sealing is effected on both sides of the gasket 244. To be sure that a good seal is obtained, the gasket 244 should be wide enough for at least about one-half of the thickness of the edge to interfere with both the counterbore surface 30 and the surface 245 when the seal system 240 is actuated. Preferably, the gasket 244 substantially entirely fills the space between surface 243 and the retainer ring 246.

Figure 4:
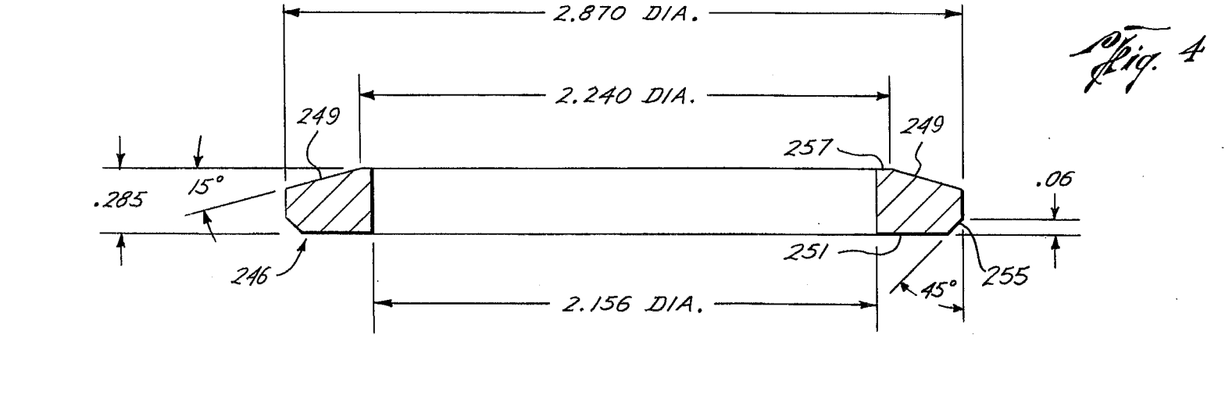
FIG. 4 is an axial sectional view of the retainer ring for the seal system of the valve.
Figure 5:
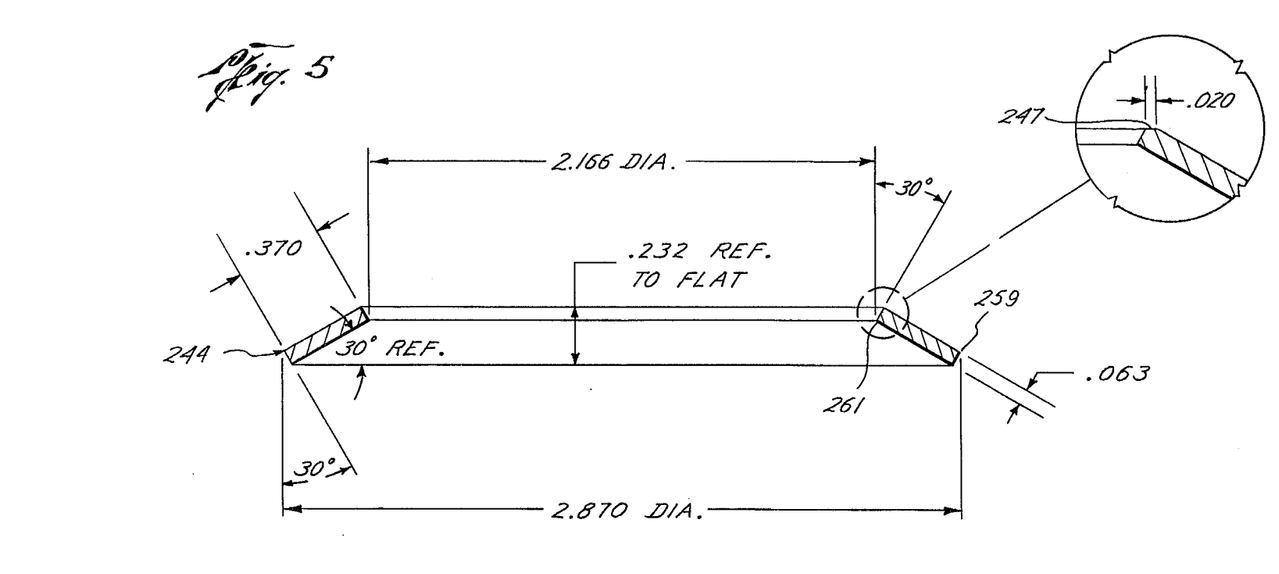
FIG. 5 is an axial sectional view and an enlarged fragmentary sectional view taken on the same plane showing a frusto-conical metal seal gasket ring for the seal system of the valve.

FIGS. 4 and 5 show typical dimensions for the gaskets and rings for a 1-13/16 inch bore diameter for a valve.

It is apparent that in order for such metal-to-metal seal to occur, the gasket 244 is made of a material which is softer than the materials of the housing 10 and hub 50, so that the inner and outer edges are deformed or "coined" to conform to the surfaces engaged by the gasket 244 and do not gall the surfaces. Thus, the gasket 244 conforms to small irregularities in these surfaces, insuring a sealing fit. The preferable angles with respect to the plane perpendicular to the axis of hub 50, as well as the total lengths of surface 245 of hub 50 and retainer ring 246, should be such that when retainer ring 246 is fully within the annular groove 242, gasket 244 forms the metal-to-metal seals with the counterbore surface 30 and surface 245 of groove 242 under sufficient pressure to seal against at least the maximum expected pressure exerted by the well fluids against the seals.

The undeformed edges of the gasket 244 are preferably substantially perpendicular to the surfaces 243, 249 in order that coining of the edges will result in the gasket 244 substantially filling the space between the surface 243 and ring 246.

Because the gasket 244 has an outside diameter which is substantially smaller than the counterbore 22 of the housing 10, there is no chance that the surface of the gasket 244 can be damaged by scraping on the counterbore surface 30 of the housing 10 upon insertion of the seat hub 50 into counterbore 22, the first contact of the gasket 244 with the counterbore surface 30 being when the seal system is actuated. The final position of the seal is at substantially the point at which the actuation of the seal system is to be accomplished. This substantially eliminates the possibility of damage to the gasket 244 prior to contact of the end of hub 50 with shoulder 26 at which point all movement of seal system 240 will stop.

The gasket 244 is substantially rigid. The gasket 244 is not a Bellville spring, which would be too hard and would gall the valve housing or seat hub. Rather, gasket 244 is formed of a material such as copper, copper alloys, aluminum, stainless steel or steel, which is softer than the material of the surfaces against which it seals. Gasket 244 must coin without imprint on the valve body or seat hub (which may be only 30 Rockwell hardness). Sometimes the gasket 244 is made from the same material as the materials of the surfaces against which it seals but annealed to make it softer, so that it will not damage the other surfaces.

Stainless steels have been found to have suitable characteristics for the gasket 244 of this invention. However, stainless steel tends to work-harden, so that it could beccome harder than the surfaces against which it seals and the metal-to-metal seal fitting of the gasket 244 between these surfaces could cause damage to the surfaces. This may be avoided, according to a preferred embodiment of the present invention, by the aforesaid breaking of the edges of the gasket and by "coining" into the surfaces.

The retainer ring 246 may be of fairly hard material such as 4140 steel, but should make a close or press fit with the surface 245 and should be of a diameter to insure non-contact with surface 30.

The valve body and seat hub may be made of any steel conventionally used for high pressure valves.

It will be noted that the cone of metal gasket 244 in FIGS. 2 and 3 points toward the pressure being sealed against. For a seat hub seal, this may be preferred, although when sealing between parallel surfaces, the inner and outer peripheries of the seal are similarly engaged and hence reversible. The inner and outer peripheries of the ring gaskets 244 may be viewed as forming seals adapted respectively to seal against pressure directed against the convex or concave faces of the gasket 244.

In the preferred embodiment, one metal seal gasket 244 is preferred because it seals satisfactorily and requires less make-up load to set the seal.

As set out in U.S. Pat. No. 4,029,294, referring now to FIG. 1, gate 40 is reciprocated by means of a pressure balanced stem having an upper stem member 80 and a lower stem member 82. Lower stem member 82 includes a head 84 at its upper end which is enclosed between gate segments 70, 72 within counterbores 86, 88 in the inner faces of the lower portions of segments 70, 72. Counterbores 86, 88 have sufficient axial length to permit limited axial movement of head 84 with respect to gate 40. Upper stem member 80 includes a T-shaped lug member 90 threaded or welded on to the lower end of upper stem member 80. The T-shaped lug member 90 is also enclosed between gate segments 70, 72 within corresponding T-shaped and semi-circular counterbores 92, 94. This structure is old and forms no part of the present invention, therefore a more detailed description has not been made.

The lower end of the valve housing 10 is provided with a bore 95 coaxial with chamber 18 and with a counterbore 96 opening from the outer end of housing 10 forming a stuffing box for receiving lower stem member 82 and adapted to receive an annular packing 98 under compression by a compression ring 100 and a gland 102 protruding from a lower closure cap 104 secured to the housing 10 by cap screws 106 or possibly by bolts. The housing 10 and closure cap 104 have corresponding mating annular grooves 108, 110 for receiving a lower ring gasket 112 to provide a metal-to-metal seal therebetween. The lower closure cap 104 has a bore 114 for slidingly receiving the lower stem member 82. A transverse passage 116 in closure cap 104 provides communication between bore 114 and bleeder vlave 118 to relieve any build up of line fluids in bore 114. The lower stem member 82 reciprocates in response to reciprocal movement of the gate 40, and packing 98 serves to slidably seal about the lower stem member 82.

There is provided on the upper portion of lower stem member 82 below head 84 a metal seat ring 120 defining a downwardly facing annular shoulder 122 surrounding the lower end of seat ring 120. Shoulder 122 is arcuate and cooperates with a beveled seat 124 located at the entrance of bore 95 at the bottom of chamber 18 forming a metal-to-metal seal therewith as further described in U.S. Pat. No. 4,029,294.

As set out in U.S. Pat. No. 4,029,294, referring to FIG. 1, the upper end 128 of chamber 18 is adapted to be closed by means of a tubular cap or bonnet 130 having a closure flange 132 secured to the upper end 134 of housing 10 by means of studs 136 or possibly by bolts or capscrews. Bonnet 130 has an axial bore 138 for receiving upper stem member 80. Upper stem member 80 has a double seal or backseat 220 radially projecting from and integral (i.e. the backseat 220 and stem 80 are one piece) with upper stem 80 thereby preventing any leakage behind the backseat 220. For further description see U.S. Pat. No. 4,029,294.

As set out in U.S. Pat. No. 4,029,294, axial bore 138 includes an enlarged portion 154 having a diameter greater than the diameter of backseat 220 for receiving same. Enlarged portion 154 terminates in a lower counterbore 158 which is adapted to receive closure ring 160 having an axial stem-receiving bore coaxial with closure chamber 18 and bonnet bore 138. In the assembly of the valve upper stem member 80 is inserted into bore 138 with enlarged portion 154 receiving backseat 220. Closure ring 160 then slides around upper stem member 80 behind backseat 220 and is received by counterbore 158. It is at this time that lug member 90 is threaded onto upper stem member 80 for attachment with gate 40 and gate 40 is inserted between gate seat members 32, 34.

Closure ring 160 when received within counterbore 158 makes enlarged portion 154 into a chmaber for the reciprocation of backseat 220. Enlarged portion 154 forms an internal downwardly facing beveled shoulder or seat 156 and ring 160 includes an upwardly facing beveled conical shoulder or seat 186 at the upper end of bore 184 opposing shoulder 156 after assembly.

Backseat 220 and seat ring 120 are formed in spaced-apart relation on upper stem 80 and on lower stem 82 respectively whereby in the closed flow way position, backseat 220 will sealingly engage shoulder 186 providing a metal-to-metal seal therebetween and seat ring 120 will sealingly engage shoulder 124 providing a seal therebetween as the line fluid pressure forces seat ring 120 downwardly by means of the limited axial movement of head 84 within counterbores 86, 88. Backseat 220 is also spaced on upper stem 80 whereby in the open flow way position seat 200 will sealingly engage shoulder 156 providing a metal-to-metal seal therebetween.

The closure ring 160 and its appurtenances are identical in construction and are arranged symmetrically on both upper and lower sides to permit reversibility, so the description of one will be applicable to both. Ring 160 includes an upper and lower ring gasket groove 162, 164 for receiving upper and lower metal ring gaskets 166, 168 for sealing between the bonnet 130 and ring 160 and ring 160 and housing 10.

The bottom portion of counterbore 158 includes a ring gasket groove 196 having the same features and dimensions as groove 164. Further ring gasket grooves 108, 110 in lower housing 10 and cap 104 have the same features, dimensions and arrangements as grooves 196, 162. Details of ring gasket grooves, such as groove 164, and the rings and mounting of the rings, such as ring 160, are further described in U.S. Pat. No. 4,029,294.

As set out in U.S. Pat. No. 4,029,294, referring now to FIG. 1, upper stem member 80 is provided with an externally threaded portion 170 at its upper end which extends through stuffing box 142 wherein packing 144 serves to slidably seal about the stem member 80. An internally threaded drive nut 172 extends into cap 152 and is internally threaded at 174 to threadingly engage threaded portion 170 whereby rotation of the nut 172 will serve to raise and lower the closure member, i.e. stem members 80, 82 and gate 40, in accordance with the direction of the rotation of the nut 172, in order to move the gate 40 between flow way-opening and flow way-closing positions. The lower end of the nut 172 has an annular flange 173 which supports upper antifriction bearings 176 against the top of cap 152 and bears against lower antifriction bearings 178 which rest on gland 150. The upper portion of the nut 172 which projects above the cap 152, is provided with conventional flats at 180 for mounting an operating wheel 182 or other conventional operator, by which the gate 40 is actuated.

A bleeder valve 223 communicating with bore 138 by means of passage 225 through bonnet 130 provides a means to relieve bore 138 of any build up of line fluids when packing 144 is to be replaced.

The details of the use of metal-to-metal stem seals with packing 144 and 98 is set out in U.S. Pat. No. 4,029,294.

In operation as the valve is closed by operator 182, upper stem 80, gate 40, and lower stem 82 move downwardly into the lower position. Seat 120 on lower stem 82 seals with shoulder 124. Seat 120 is not mechanically actuated into sealing engagement but the line pressure forces seat 120 into sealing engagement with shoulder 124. Such movement by seat 120 is allowed by the limited axial movement permitted between head 84 and gate 40, which may be considered a lost motion connection. Backseat 220 then engages shoulder 186 forming a metal-to-metal seal. After seat 120 engages shoulder 124, further movement downwardly by upper stem 80 drives backseat 220 onto shoulder 186. As the valve is opened by operator 182, backseat 220 travels upwardly until backseat 220 sealingly engages shoulder 156 providing a metal-to-metal seal.

In closing or opening the valve, bleeder valve 118 should be open whereby the line pressure will provide a balanced pressure force on both the lower stem 82 and upper stem 80. Without such a balanced pressurized stem, the pressure on the upper stem 80 would place such a load on stem 80 as to require a very high torque to be used on stem 80 to open and close the valve. Bleeder valve 118 is used to bleed out pressure below lower stem 82 so as to prevent any upward pressure on stem 82.

It will be seen that when the gate 40 is moved to the flow way-closing position, shown in FIGS. 1 and 2, the differential line pressure across the closed valve will act on the downstream reservoir 54, the differential line pressure being exerted against the barrier 57 urging it inwardly of reservoir 54 and simultaneously forcing sealant 56 from reservoir 54 into sealant groove 64 to seal off between outer surface 62 of the hub 50 and the surrounding wall 30 of chamber 18, and through passage 66 and recess 78 into sealant groove 68 provided at the inner surface of the seat member 72 to seal about the opening between the seat member 34 and the related closure segment 72. Thus, sealant seals will automatically be provided between both surfaces 46, 62 of the seat member 34 and the related portions of the closure segment 72 and the wall 30 of chamber 18. The sealing action will be simultaneous. Seals, such as 240 will be effective to prevent loss of sealant 56 from sealant groove 64. This permits effective sealing of the exterior of seat hub 50 while assuring against loss of sealant 56 due to any gap between the hub 50 and body 10 at counterbore 22.

The above are, of course, merely exemplary of possible changes or variations.

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A valve comprising:
   a valve body having an inlet and an outlet with a chamber therebetween;
   a seat located in said body;
   a closure member having flow means for cooperating with said seat for preventing fluid flow in the closed position and for permitting fluid flow in the open position;
   interfitting portions on said seat and in said body at the outlet; and
   seal means for providing sealing engagement between said interfitting portions when said seat and valve body are fully slidably interfitted with each other, said seal means including a dished metal ring gasket mounted on said seat, said gasket being in metal-to-metal sealing engagement with said valve body and said seat when said seat and valve body are fully interfitted, said seal means further including a retainer ring reciprocably mounted on said seat adjacent to said dished metal ring gasket, said retainer ring having a surface for forcing said dished metal ring gasket into metal-to-metal sealing engagement with said valve body and said seat.

2. The valve of claim 1 wherein said dished metal ring gasket is frusto-conical in shape and said surface of said retainer ring adjacent to said dished metal ring gasket is frusto-conical in shape, the cone of said dished metal ring gasket and said adjacent surface being in the same direction.

3. The valve of claim 2 wherein said cones point toward the valve pressure to be sealed against.

4. A valve comprising:
   a valve body having an inlet and an outlet with a chamber therebetween;
   a seat located in said body;
   a closure member having flow means for cooperating with said seat for preventing fluid flow in the closed position and for permitting fluid flow in the open position;
   interfitting portions on said seat and in said body at the outlet; and
   seal means for providing sealing engagement between said interfitting portions when said seat and valve body are fully slidably interfitted with each other, said seal means including a dished metal ring gasket mounted on said seat, said gasket being in metal-to-metal sealing engagement with said valve body and said seat when said seat and valve body are fully interfitted, said dished metal ring gasket being frusto-conical in shape and being bounded on its sides by first and second surfaces which are frusto-conical in shape but with greater cone angles than said dished metal ring gasket prior to said valve body and stem fully interfitting, said interfitting portion of said seat including a groove having said first surface, said seal means including a retainer ring reciprocably mounted in said groove and having said second surface.

5. In a seat sealing system for a valve having a valve housing, the housing including a flow bore therethrough and a counterbore coaxial with the bore, the counterbore forming a first shoulder with the bore, and having a seat hub telescopically received in the housing, the seat hub having an outer circumferential groove formed at the end thereof adjacent the first shoulder, the groove including a second shoulder thereon juxtaposed with the first shoulder, the improvement comprising:

a metal seal ring mounted on the seat hub adjacent to the second shoulder; and a retainer ring mounted on the seat hub between said metal seal ring and the first shoulder;

the surface of the second shoulder and the surface of said retainer ring adjacent to said metal ring cooperating with the opposing surfaces of said metal ring to force the inner and outer edges of said metal ring into metal-to-metal sealing engagement with the seat hub and the counterbore upon the telescopic insertion of the seat hub into the housing substantially to the position where the seat hub abuts the first shoulder.

* * * * *

UNITED STATES PATENT AND TRADEMARK OFFICE
CERTIFICATE OF CORRECTION

PATENT NO. : 4,264,054

DATED : APRIL 28, 1981

INVENTOR(S) : CHARLES D. MORRILL

It is certified that error appears in the above—identified patent and that said Letters Patent are hereby corrected as shown below:

Column 3, line 57, change "commnicates" to -- communicates --

Column 4, line 33, change "reversed" to -- reverse --.

Column 7, line 37, change "on to" to -- onto --.

Column 1, after "CROSS REFERENCE TO RELATED APPLICATIONS" insert the following paragraph:

-- This application is a continuation-in-part of my copending United States patent application Serial Number 833,553, filed September 15, 1977; and a continuation-in-part of my copending United States patent application Serial Number 697,084, filed June 16, 1976, which is a continuation-in-part of United States patent 4,056,272, filed September 10, 1975, which is a continuation-in-part of United States patent application Serial Number 447,141, filed March 1, 1974, now abandoned. --.

Column 1, line 35, change "balance" to -- balanced --.

Column 1, line 50, change "environment" to -- environments --.

UNITED STATES PATENT AND TRADEMARK OFFICE
CERTIFICATE OF CORRECTION

PATENT NO. : 4,264,054
DATED : APRIL 28, 1981
INVENTOR(S) : CHARLES D. MORRILL

It is certified that error appears in the above-identified patent and that said Letters Patent are hereby corrected as shown below:

Column 1, line 59, change "2,922,840" to -- 2,992,840 --.
Column 2, line 22, change "relative to the body" to -- relative to the valve body --.
Column 2, line 53, delete the hyphen (-) at the end of the line.
Column 2, line 62, underline "infra".
Column 7, line 1, change "becaome" to -- become --
Column 7, line 58, change "vlave" to -- valve --.
Column 8, line 30, change "chmaber" to -- chamber --.

Signed and Sealed this

Eighteenth Day of August 1981

[SEAL]

Attest:

Attesting Officer

GERALD J. MOSSINGHOFF

Commissioner of Patents and Trademarks